(12) United States Patent
Lee et al.

(10) Patent No.: US 7,697,783 B2
(45) Date of Patent: Apr. 13, 2010

(54) CODING DEVICE, CODING METHOD, DECODING DEVICE, DECODING METHOD, AND PROGRAMS OF SAME

(75) Inventors: Hung-Ju Lee, Pleasanton, CA (US); Jun Murayama, Tokyo (JP); Takefumi Nagumo, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 272 days.

(21) Appl. No.: 11/189,379

(22) Filed: Jul. 26, 2005

(65) Prior Publication Data

US 2007/0025621 A1 Feb. 1, 2007

(51) Int. Cl.
*G06K 9/40* (2006.01)
(52) U.S. Cl. ...................... 382/275; 348/607; 358/3.26; 382/236; 382/269
(58) Field of Classification Search ............ 375/240.24, 375/240.29; 382/236, 275, 269; 345/607; 358/3.26

See application file for complete search history.

(56) References Cited

U.S. PATENT DOCUMENTS

| | | | | |
|---|---|---|---|---|
| 5,051,902 A | * | 9/1991 | Hishinuma | 382/263 |
| 5,387,938 A | * | 2/1995 | Fukuda et al. | 375/240.24 |
| 6,055,340 A | * | 4/2000 | Nagao | 382/261 |
| 6,178,205 B1 | * | 1/2001 | Cheung et al. | 375/240.29 |
| 6,373,992 B1 | * | 4/2002 | Nagao | 382/266 |
| 6,667,815 B1 | * | 12/2003 | Nagao | 358/1.9 |
| 6,990,252 B2 | * | 1/2006 | Shekter | 382/276 |
| 7,164,807 B2 | * | 1/2007 | Morton | 382/269 |
| 2004/0169891 A1 | * | 9/2004 | Maurer | 358/3.26 |
| 2005/0094035 A1 | * | 5/2005 | Babonneau et al. | 348/607 |

* cited by examiner

*Primary Examiner*—Gregory M Desire
(74) *Attorney, Agent, or Firm*—Frommer Lawrence & Haug LLP; William S. Frommer; Ellen Marcie Emas

(57) ABSTRACT

A coding device having a specifying unit for specifying image region data to be processed for refreshing countermeasures in image data being coded based on that image data and a refreshing countermeasure unit for applying processing for refreshing countermeasures to image region data specified by the specifying unit when coding the image data.

18 Claims, 17 Drawing Sheets

1

FIG. 5
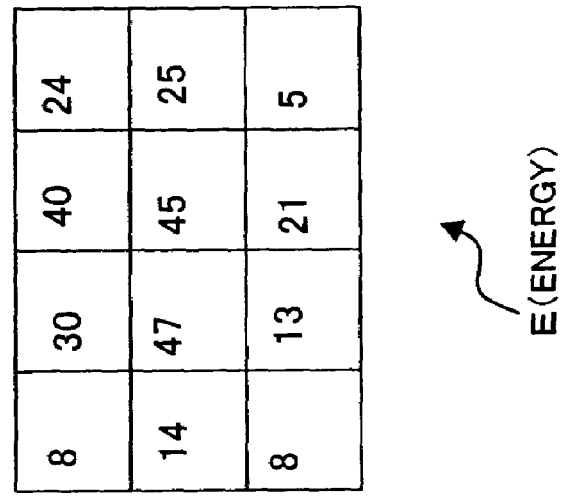
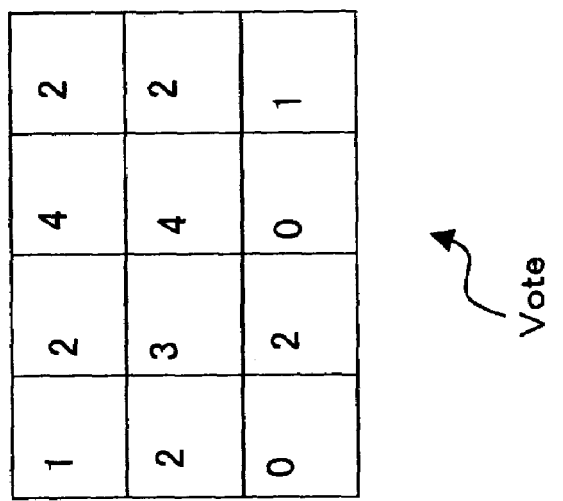

FIG. 9

FIG. 10
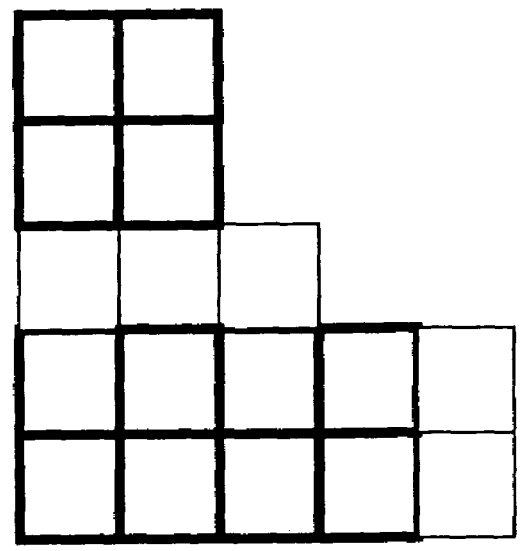
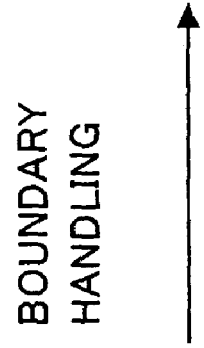
BOUNDARY HANDLING
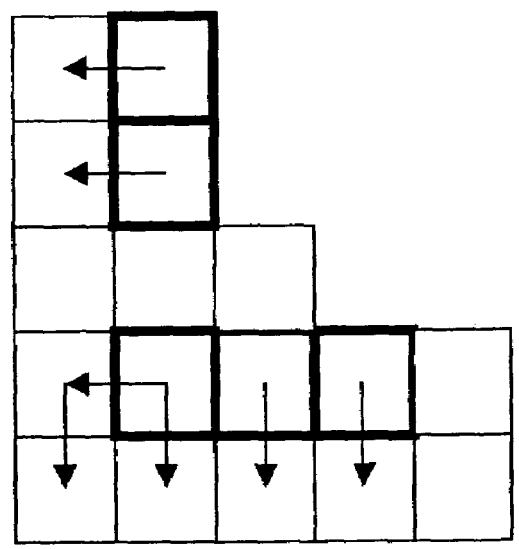

CODING DEVICE, CODING METHOD, DECODING DEVICE, DECODING METHOD, AND PROGRAMS OF SAME

BACKGROUND OF THE INVENTION

1. Field of the Invention

The present invention relates to a coding device, a coding method, a decoding device, and a decoding method of image data and programs of the same.

2. Description of the Related Art

In recent years, for the purpose of handling image data digitally and at that time transmitting and storing information highly efficiently, coding devices and decoding devices based on the MPEG (Moving Picture Experts Group), H.264/AVC (Advanced Video Coding), and other coding systems utilizing the redundancy peculiar to image information and compressing data by a discrete cosine transform or other orthogonal transform and motion compensation are now spreading in use for both distribution of information at broadcast stations etc. and reception of the information at general homes.

The above coding method assigns picture types I, P, and B based on a GOP (Group Of Pictures) structure to the plurality of picture data forming moving picture image data, performs intra-coding for the I-picture data, and performs inter-coding for the P- and B-picture data.

In the above coding device, however, for example, at a flat image region in the picture data, a noise pattern known as "refreshing" (grain noise) occurs in the decoded image. This becomes perceived and results in a drop in the quality of the decoded image.

SUMMARY OF THE INVENTION

It is desirable to provide a coding device, a coding method, a decoding device, a decoding method, and programs of the same enabling an improvement of a perceived quality of a decoded image.

According to a first aspect of the invention, there is provided a coding device having a specifying means for specifying image region data to be processed for refreshing countermeasures in image data being coded based on that image data and a refreshing countermeasure means for applying processing for refreshing countermeasures to image region data specified by the specifying means when coding the image data.

According to a second aspect of the invention, there is provided a coding method comprising a first step of specifying image region data to be processed for refreshing countermeasures in image data being coded based on that image data and a second step of applying processing for refreshing countermeasures to image region data specified in the first step when coding the image data.

According to a third aspect of the invention, there is provided a program run by a computer comprising a first routine of specifying image region data to be processed for refreshing countermeasures in image data being coded based on the image data and a second routine of applying processing for refreshing countermeasures to image region data specified in the first routine when coding the image data.

According to a fourth aspect of the invention, there is provided a decoding device having a decoding means for decoding encoded image data to generate decoded image data, a specifying means for specifying image region data to be processed for refreshing countermeasures in the decoded image data generated by the decoding means based on the decoded image data, and a refreshing countermeasure means for applying processing for refreshing countermeasures to the image region data specified by the specifying means in the decoded image data generated by the decoding means.

According to a fifth aspect of the invention, there is provided a decoding method comprising a first step of decoding encoded image data to generate decoded image data, a second step of specifying image region data to be processed for refreshing countermeasures in the decoded image data generated in the first step based on the decoded image data, and a third step of applying the processing for refreshing countermeasures to the image region data specified in the second step in the decoded image data generated in the first step.

According to a sixth aspect of the invention, there is provided a program run by a computer comprising a first routine of decoding encoded image data to generate decoded image data, a second routine of specifying image region data to be processed for refreshing countermeasures in the decoded image data generated in the first routine based on the decoded image data, and a third routine of applying processing for refreshing countermeasures to the image region data specified in the second routine in the decoded image data generated in the first routine.

According to the present invention, a coding device, a coding method, a decoding device, a decoding method, and programs of the same able to improve the perceived quality of the decoded image can be provided.

BRIEF DESCRIPTION OF THE DRAWINGS

These and other objects and features of the present invention will become clearer from the following description of the preferred embodiments given with reference to the attached drawings, wherein:

FIG. 5 is a view for explaining the processing of step ST13 shown in FIG. 4;

FIG. 9 is a view for explaining the processing of step ST16 shown in FIG. 4;

FIG. 10 is a view for explaining the processing of step ST17 shown in FIG. 4;

DESCRIPTION OF THE PREFERRED EMBODIMENTS

Figure 1:
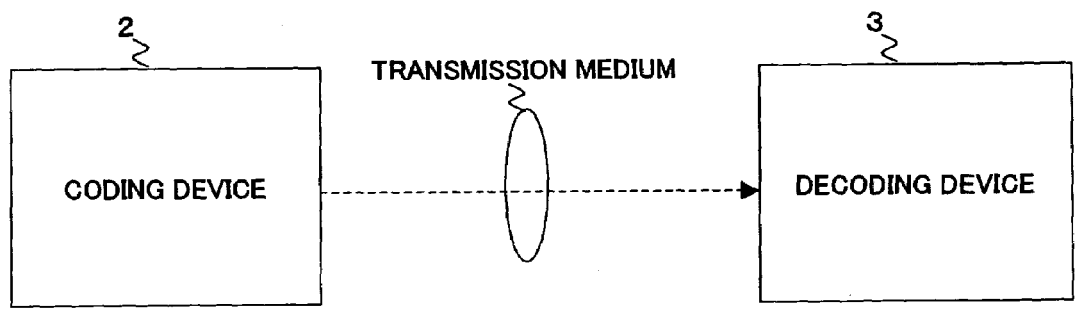
FIG. 1 is a view of the configuration of a communication system of an embodiment of the present invention.

Below, an explanation will be given of a communication system 1 of a preferred embodiment of the present invention. FIG. 1 is a conceptual view of the communication system 1 of the present embodiment. As shown in FIG. 1, the communication system 1 has a coding device 2 provided on a transmission side and a decoding device 3 provided on a reception side. In the communication system 1, the coding device 2 on the transmission side generates frame image data (bit stream) compressed by a discrete cosine transform, Karhunen-Loewe transform, or other orthogonal transform and motion compensation, modulates the frame image data, then transmits the same via a satellite broadcast wave, cable TV network, telephone line network, cell phone line network, or other transmission medium. In the reception side, the decoding device 3 demodulates the received image signal, then generates and uses the frame image data decompressed by the inverse transform to the orthogonal transform at the time of modulation and the motion compensation. Note that the transmission medium may be an optical disk, magnetic disk, semiconductor memory, or other storage medium as well.

Coding Device 2

Figure 2:
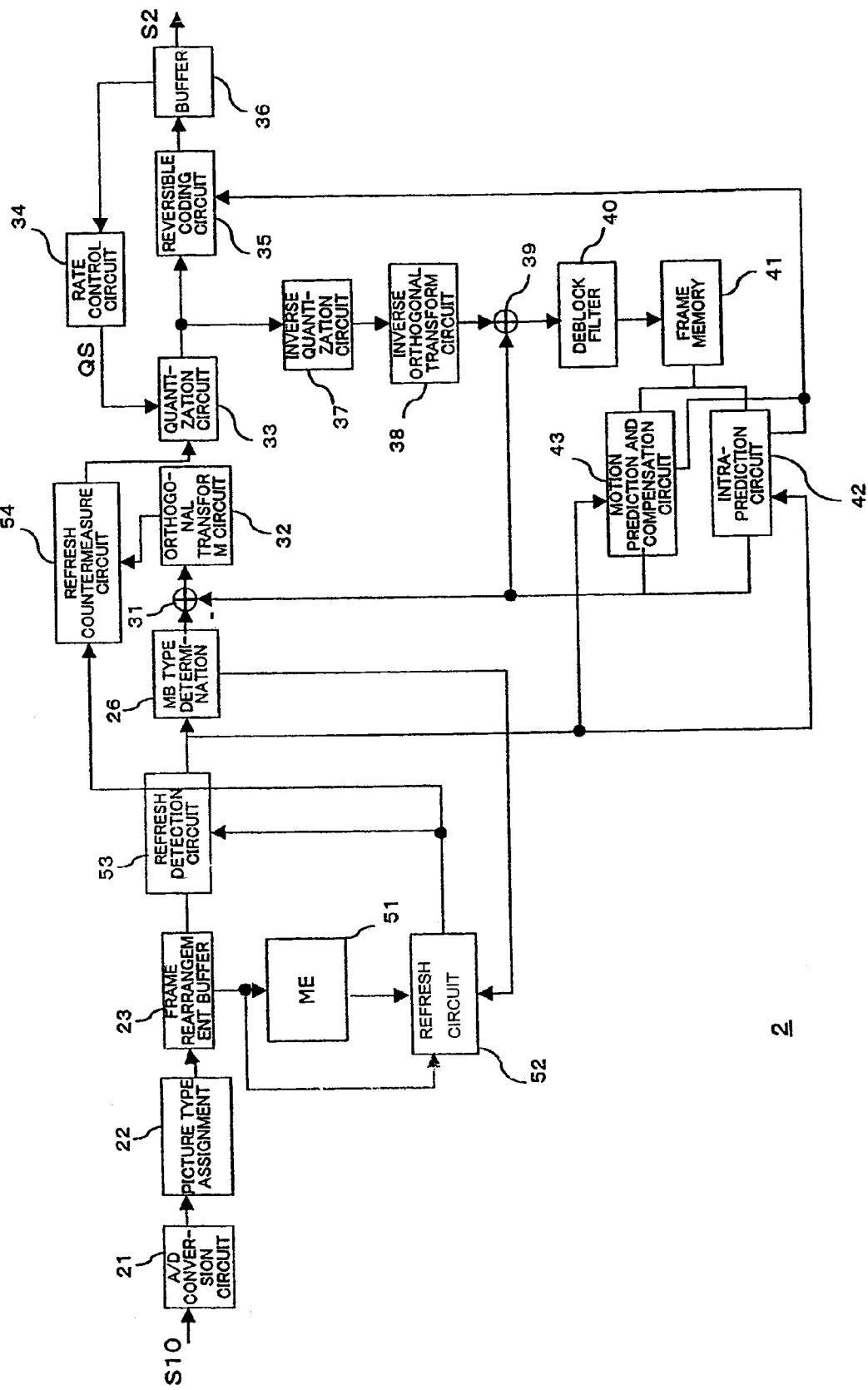
FIG. 2 is a functional block diagram of a coding device shown in FIG. 1.

Below, an explanation will be given of the coding device 2 shown in FIG. 1. FIG. 2 is a view of the overall configuration of the coding device 2 shown in FIG. 1. As shown in FIG. 2, the coding device 2 has for example an A/D conversion circuit 21, picture type assignment circuit 22, frame rearrangement circuit 23, MB type determination circuit 26, computation circuit 31, orthogonal transform circuit 32, quantization circuit 33, rate control circuit 34, reversible coding circuit 35, buffer memory 36, inverse quantization circuit 37, inverse orthogonal transform circuit 38, adder circuit 39, deblock filter 40, frame memory 41, intra-prediction circuit 42, motion prediction and compensation circuit 43, motion prediction and compensation circuit 51, refresh detection circuit 52, refresh countermeasure circuit 53, and refresh countermeasure circuit 54.

Below, an explanation will be given of the components of the coding device 2.

A/D Conversion Circuit 21

The A/D conversion circuit 21 converts an input original image signal S10 comprised of an analog luminance signal Y and color difference signals Pb and Pr to digital picture data and outputs this to the picture type assignment circuit 22.

Picture Type Assignment Circuit 22

The picture type assignment circuit 22 assigns one of the picture type I, P or B to each of the picture data input from the A/D conversion circuit 21.

Frame Rearrangement Circuit 23

The frame rearrangement circuit 23 rearranges the picture data generated by the A/D conversion circuit 22 to a sequence for coding in accordance with a GOP (Group of Pictures) structure comprised of picture types I, P, and B assigned at the picture type assignment circuit 22 and outputs the result to the motion prediction and compensation circuit 51 and the refresh countermeasure circuit 53.

MB Type Determination Circuit 26

The MB type determination circuit 26 determines a macro block type (for example 4×4 or 16×16 type) of each of the picture data rearranged by the frame rearrangement circuit 23.

Computation Circuit 31

The computation circuit 31 generates image data indicating the difference between the picture data being coded input from the MB type determination circuit 26 and predicted image data PI input from the intra-prediction circuit 42 or the motion prediction and compensation circuit 43 and outputs this to the orthogonal transform circuit 32.

Orthogonal Transform Circuit 32

The orthogonal transform circuit 32 applies a discrete cosine transform (DCT), Karhunen-Loewe transform, or other orthogonal transform to the image data input from the computation circuit 31 to generate image data indicating the transform coefficient (for example DCT coefficient) and outputs this to the refresh countermeasure circuit 54. The orthogonal transform circuit 32 applies the orthogonal transform based on for example a block size determined at the MB type determination circuit 26.

Quantization Circuit 33

The quantization circuit 33 quantizes the image data S54 (transform coefficient before quantization) input from the refresh countermeasure circuit 54 based on a quantization scale QS input from the rate control circuit 34 to generate image data indicating the transform coefficient after the quantization and outputs this to the reversible coding circuit 35 and the inverse quantization circuit 37.

Rate Control Circuit 34

The rate control circuit 34 generates the quantization scale QS based on for example the image data read out from the buffer memory 36 and outputs this to the quantization circuit 33.

Reversible Coding Circuit 35

The reversible coding circuit 35 stores the image data obtained by variable length coding of the image data input from the quantization circuit 33 in the buffer 28. At this time, the reversible coding circuit 35 stores a motion vector MV input from the motion prediction and compensation circuit 43 or the difference motion vector thereof, identification data of the reference image data, and an intra-prediction mode input from the intra-prediction circuit 42 in the header data etc.

Buffer Memory 36

The image data stored in the buffer memory 36 is modulated etc. and then transmitted as image data S2. The image data S2 is decoded by the decoding device 3 as will be explained later.

Inverse Quantization Circuit 37

The inverse quantization circuit 37 applies the inverse quantization processing corresponding to the quantization of the quantization circuit 33 to the image data from the quantization circuit 33 to generate data and outputs this to the inverse orthogonal transform circuit 38.

Inverse Orthogonal Transform Circuit 38

The inverse orthogonal transform circuit 38 applies an inverse transform to the orthogonal transform in the orthogonal transform circuit 32 to the data input from the inverse quantization circuit 37 to generate image data and outputs this to the adder circuit 39.

Adder Circuit 39

The adder circuit 39 adds the image data input (decoded) from the inverse orthogonal transform circuit 38 and the predicted image data PI input from the intra-prediction circuit 42 or the motion prediction and compensation circuit 43 to generate reference (recomposed) picture data and outputs this to the deblock filter 40.

Deblock Filter 40

The deblock filter 40 eliminates only block distortion of the reference picture data input from the adder circuit 39 and writes the result into the frame memory 41.

Intra-Prediction Circuit 42

The intra-prediction circuit 42 determines the mode of intra-prediction and block size of the prediction block giving the smallest residue in a macro block to be intra-coded. The intra-prediction circuit 42 uses 4×4 and 16×16 pixels as the block size. The intra-prediction circuit 42 outputs the predicted image data PI obtained by the intra-prediction to the computation circuit 31 and the adder circuit 39 when intra-prediction is selected.

Motion Prediction and Compensation Circuit 43

The motion prediction and compensation circuit 43 performs motion prediction from an image which has been already encoded, locally decoded, and recorded in the frame memory 31 and determines the motion vector and the block size of the motion compensation for minimizing the residue. The motion prediction and compensation circuit 43 uses 16×16, 16×8, 8×16, 8×8, 8×4, 4×8, and 4×4 pixels as the block sizes. The motion prediction and compensation circuit 43 outputs the predicted image data PI obtained by the inter-prediction to the computation circuit 31 and the adder circuit 39 when inter-prediction is selected.

Figure 3:
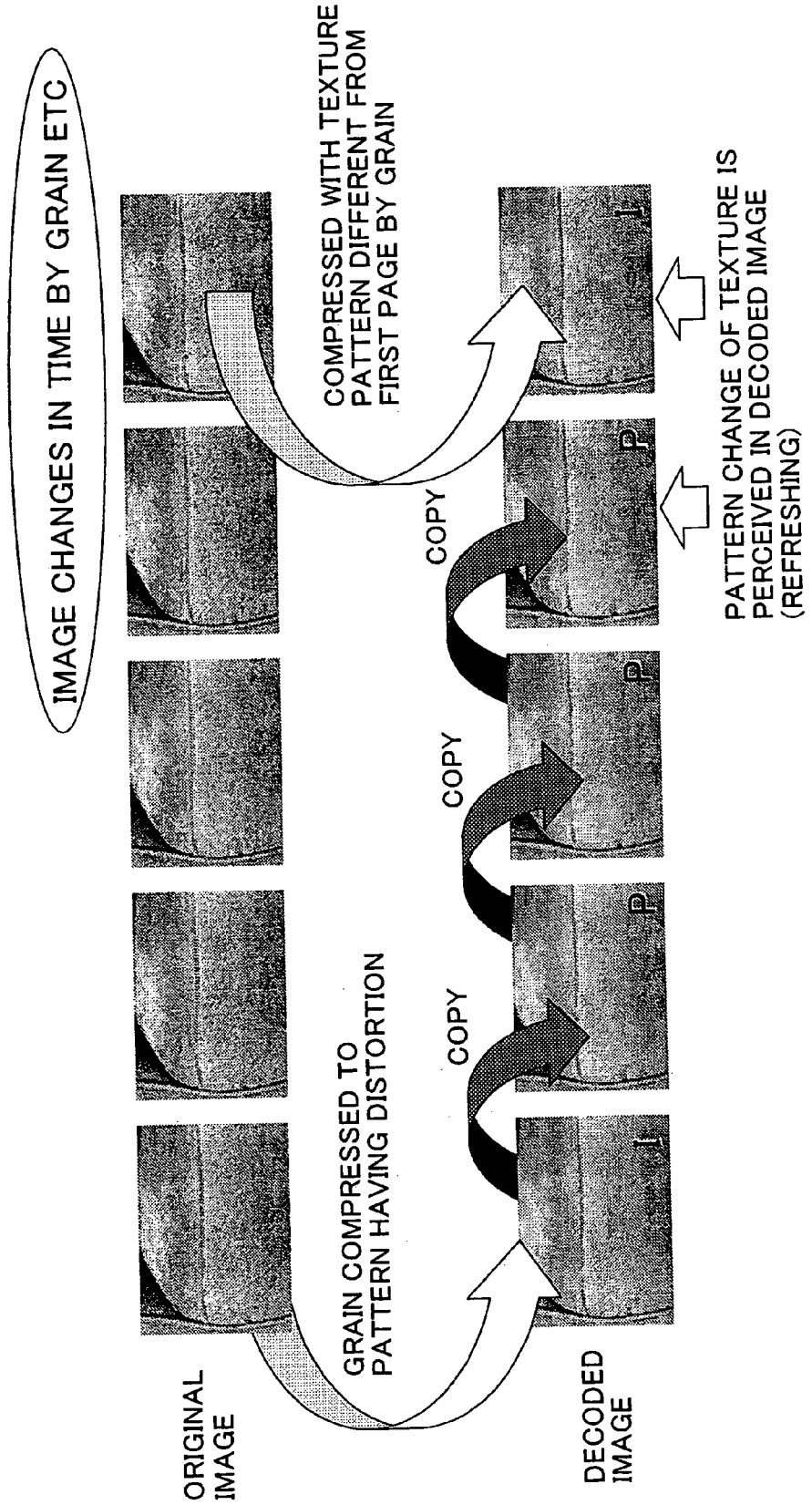
FIG. 3 is a view for explaining a cause of occurrence of refreshing.

As previously explained, when decoding an encoded image, as shown in FIG. 3, noise known as "refreshing" sometimes occurs. The refreshing is also known as "intra-refresh" or "intra-flicker" and is noise occurring for each intra-picture data.

Below, the pattern of occurrence (perception) of refreshing will be considered. "Refreshing" is perceived at a location where original images having the same characteristics continued (not having large motion). Further, refreshing is perceived at a location where the difficulties of intra- and inter-coding are the same. Further, refreshing is perceived at a location where the composition of the original images is simple.

The coding device 2 considers the characteristics explained above and calculates a refreshing occurrence prediction level Vote serving as an indicator for judging to what degree a macro block MB has characteristics by which refreshing is perceived for each macro block MB forming the image data being coded. Then, the coding device 2 determines whether or not to apply a refreshing countermeasure for each macro block MB based on the refreshing occurrence prediction level Vote.

In the coding device 2, the motion prediction and compensation circuit 51 and the refresh detection circuit 52 shown in FIG. 2 calculate the refreshing occurrence prediction level Vote explained above and determines whether or not to apply a refreshing countermeasure for each macro block MB based on this. Then, when the picture type assignment circuit 22 assigns I-picture data to the picture data to which a macro block MB belongs for a macro block MB for which refreshing countermeasures are to be taken, the refresh countermeasure circuit 53 controls the system so as to code the picture data as P-picture data. Further, the refresh countermeasure circuit 54 adjusts the image data (transform coefficient) generated by the orthogonal transform circuit 32 so that refreshing is hard to perceive for a macro block MB for which refreshing countermeasures are to be taken and outputs the result to the quantization circuit 33.

Refresh Detection Circuit 52 and Refresh Countermeasure Circuits 53 and 54

Figure 4:
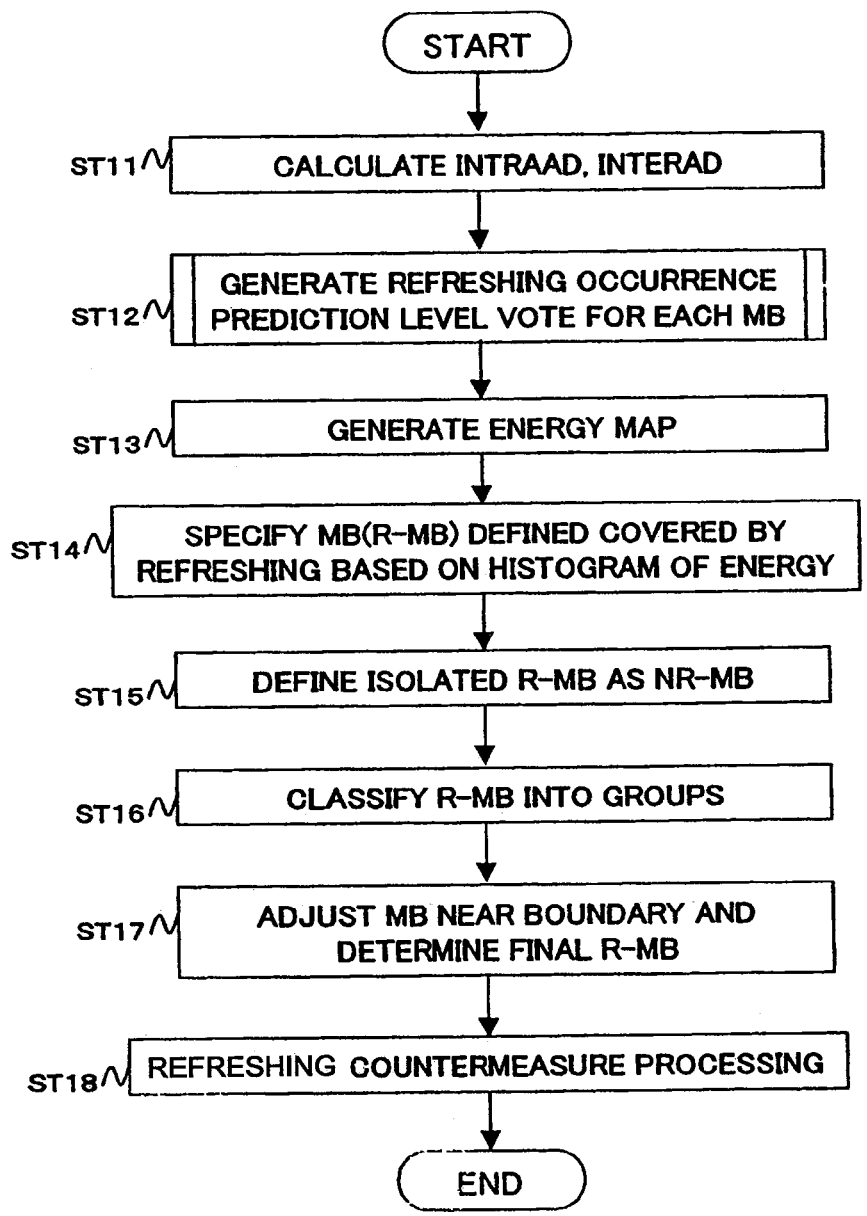
FIG. 4 is a flow chart for explaining detection of refreshing and processing for countering it by the coding device shown in FIG. 2.

Below, an explanation will be given of the detection of refreshing by the coding device 2 and the processing to counter it. FIG. 4 is a flow chart for explaining the detection of refreshing and the processing for countering it by the coding device 2 shown in FIG. 2. The following example illustrates a case where the refresh detection circuit 52 determines the macro blocks R-MB to be processed for refreshing countermeasures based on the InterAD and IntraAD from the motion prediction and compensation circuit 51. The determination is reflected in the processing for refreshing countermeasures in the refresh detection circuit 52. Separately from that, the refresh detection circuit 52 determines macro blocks R-MB to be processed for refreshing countermeasures based on the actual InterAD and IntraAD in accordance with the processing results of the motion prediction and compensation circuit 43 and the intra-prediction circuit 42. The determination is reflected in for example the processing for refreshing countermeasures in the refresh detection circuit 54. The processing for determination in the refresh detection circuit 52 in this case is the same as processings of steps ST12 to ST17 explained below except for the point that the actual InterAD and IntraAD are used.

Step ST11

The motion prediction and compensation circuit 51 shown in FIG. 2 computes the InterAD and IntraAD for each macro block MB forming the picture data being coded input from the frame rearrangement circuit 23. The motion prediction and compensation circuit 51 does not use the recomposed picture data, but uses only the picture data before coding input from the frame rearrangement circuit 23 to compute as the InterAD and the IntraAD the predicted values of the difference (residue) between the macro block MB being processed and the predicted macro block MB in the case when encoding a macro block MB being processed by each of inter-coding and the intra-coding.

Step ST12

The refresh detection circuit 52 considers the characteristics explained above and calculates the refreshing occurrence prediction level Vote serving as the indicator for judging to what degree a macro block MB has the characteristics by which refreshing is perceived for each macro block MB forming the image data being coded based on the InterAD and IntraAD computed by the motion prediction and compensation circuit 51 at step ST11. The processing of the step ST12 will be explained in detail later.

Step ST13

The refresh detection circuit 52 calculates an energy E by the following Equation (1) based on the refreshing occurrence prediction level Vote calculated at step ST12 as shown in FIG. 5.

$$E(MBi)=\text{Vote}(MBtop)*\text{Vote}(MBtop)+\text{Vote}(MBbottom)*\text{Vote}(MBbottom)+\text{Vote}(MBleft)*\text{Vote}(MBleft)+\text{Vote}(MBright)*\text{Vote}(MBright)+\text{Vote}(MBi)*\text{Vote}(MBi) \quad (1)$$

Step ST14

Figure 6:
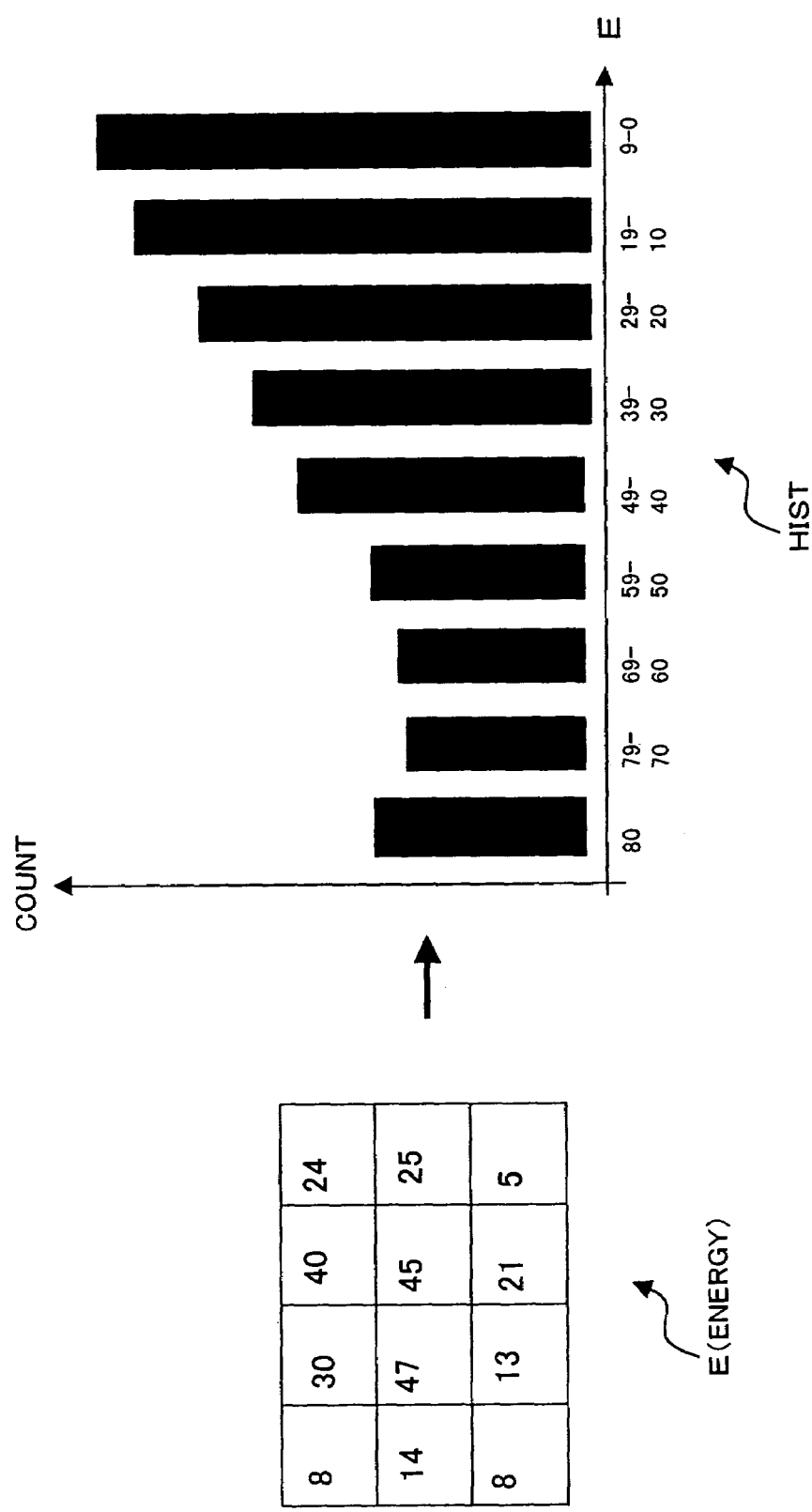
FIG. 6 is a view for explaining the processing of step ST14 shown in FIG. 4.
Figure 7:
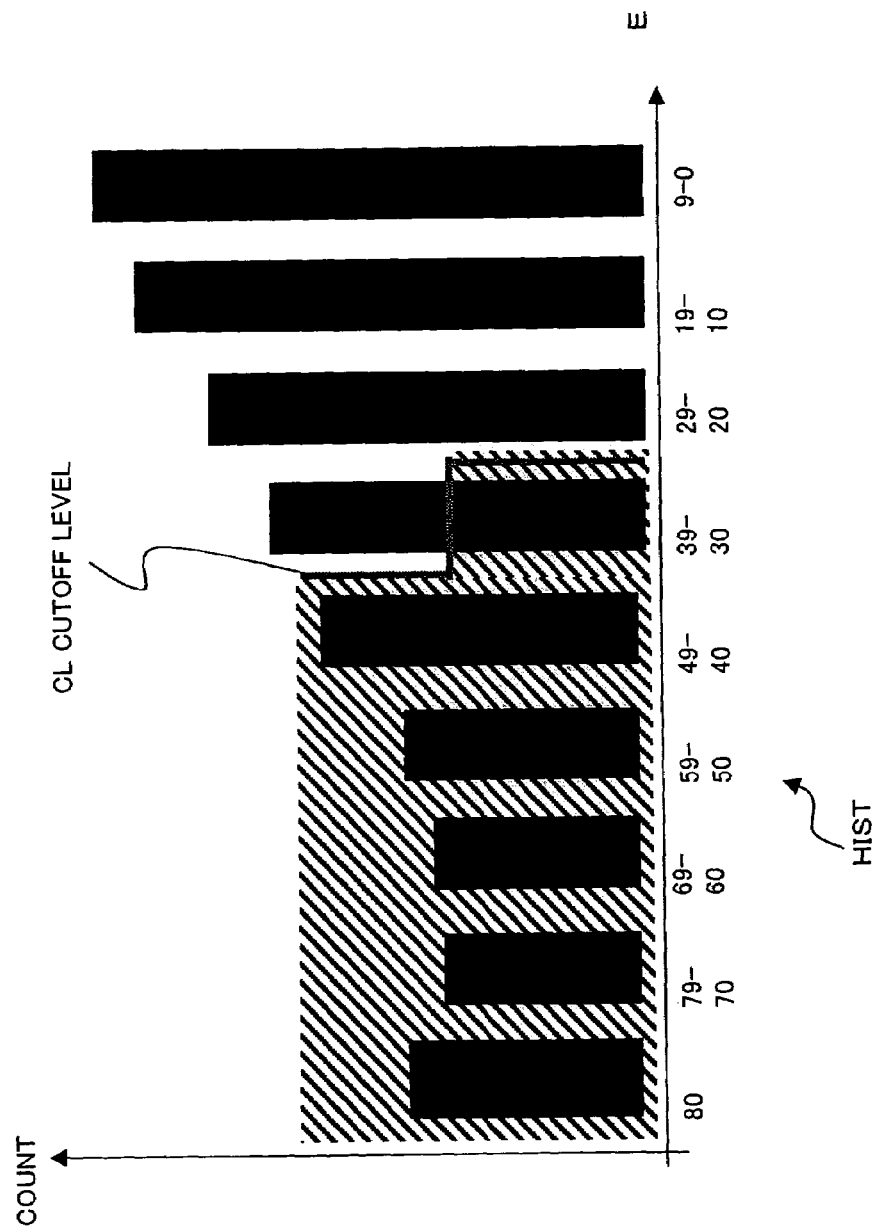
FIG. 7 is a view for explaining the processing of step ST14 shown in FIG. 4.
Figure 8:
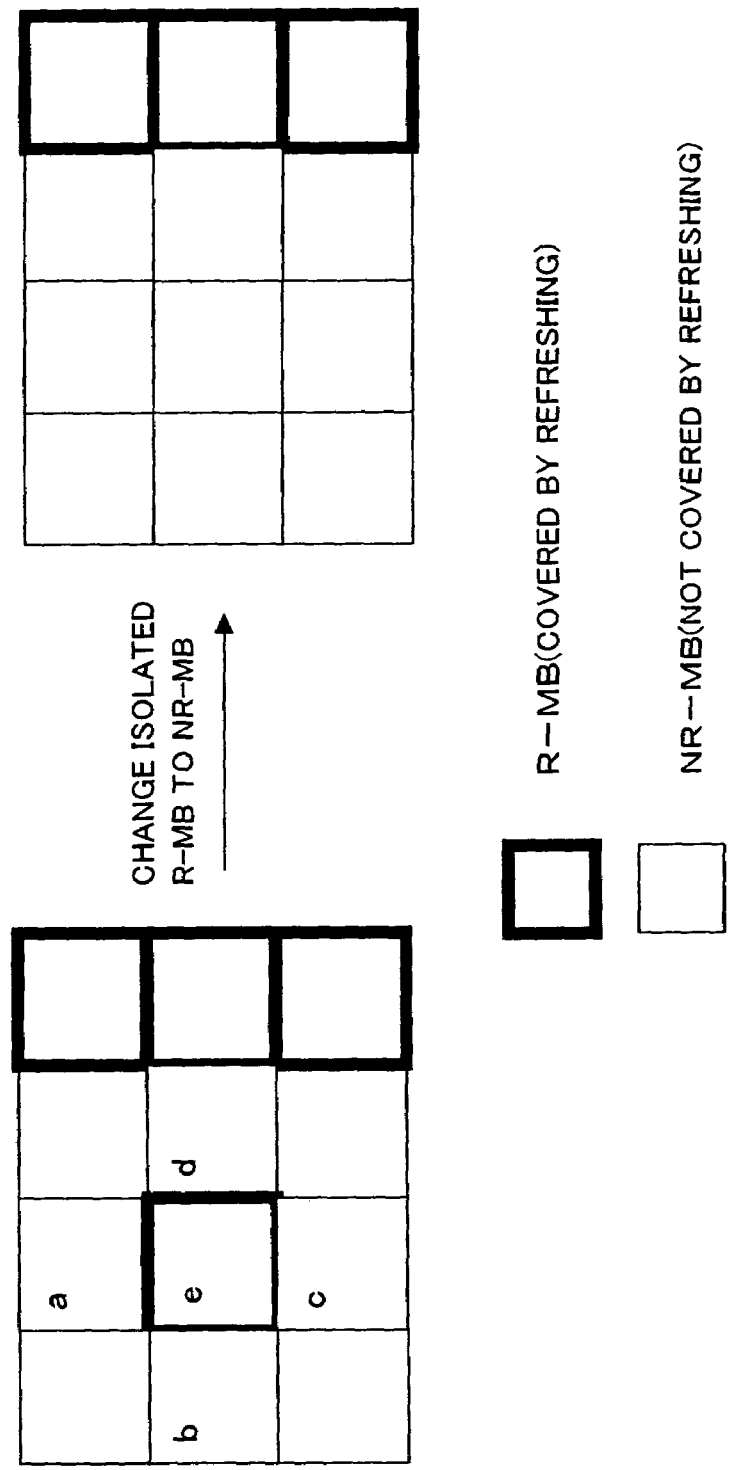
FIG. 8 is a view for explaining the processing of step ST15 shown in FIG. 4.

The refresh detection circuit 52 generates histogram data HIST shown in FIG. 6 based on the energy E calculated at step ST13. Then, the refresh detection circuit 52 determines a standard level serving as the standard for determining the coverage of the refreshing countermeasures based on the generated histogram data HIST. Specifically, the refresh detection circuit 52 determines the standard level so that a predetermined ratio (for example 20%) of macro blocks MB is covered by the refreshing countermeasures. Here, the lower the predetermined ratio, the easier the perception of refreshing in the decoded image, while the higher the predetermined ratio, the larger the overhead due to the amount of processing accompanying the refreshing countermeasures. The refresh detection circuit 52 determines a cutoff level in accordance with the standard level. Further, the refresh detection circuit 52 specifies a macro block MB having an energy E larger than the cutoff level CL as a macro block MB (R-MB) covered by the refreshing countermeasures as shown in FIG. 8.

Step ST15

The refresh detection circuit 52 removes all macro blocks R-MB(e) in which all surrounding macro blocks MB (a, b, c, d) (top, bottom, left, and right) are not macro blocks R-MB from the coverage of the refreshing countermeasures as shown in FIG. 9. Namely, they are defined as macro blocks NR-MB not covered by the refreshing countermeasures.

Step ST16

When the number of the macro blocks R-MB covered by the refreshing countermeasures is larger than the number of the macro blocks NR-MB not covered by the refreshing countermeasures in the eight macro blocks MB around a macro block MB not covered by the refreshing countermeasures being processed, the refresh detection circuit 52 defines the macro block NR-MB being processed as covered by the refreshing countermeasures. Namely, it defines this as a macro block R-MB. The refresh detection circuit 52 executes the processing exactly a predetermined number of times (for example three). In the example shown in FIG. 9, the first processing changes the macro block NR-MB(x) to a macro block R-MB and the second processing changes the macro block NR-MB(d) to a macro block R-MB.

Step ST17

The refresh detection circuit 52 changes the macro blocks MB located in the peripheral regions of picture data to macro blocks R-MB as shown in FIG. 10 when the macro blocks MB adjacent to them (adjacent at the opposite sides from the periphery) are macro blocks R-MB.

Step ST18

The refresh countermeasure circuit 53 and the refresh countermeasure circuit 54 perform the processing for refreshing countermeasures for the macro blocks R-MB determined as being covered by the refreshing countermeasures in the refresh detection circuit 52. The processing for refreshing countermeasures performed by the refresh countermeasure circuit 53 and the refresh countermeasure circuit 54 will be explained in detail later.

Step ST12 Shown in FIG. 4

Figure 11:
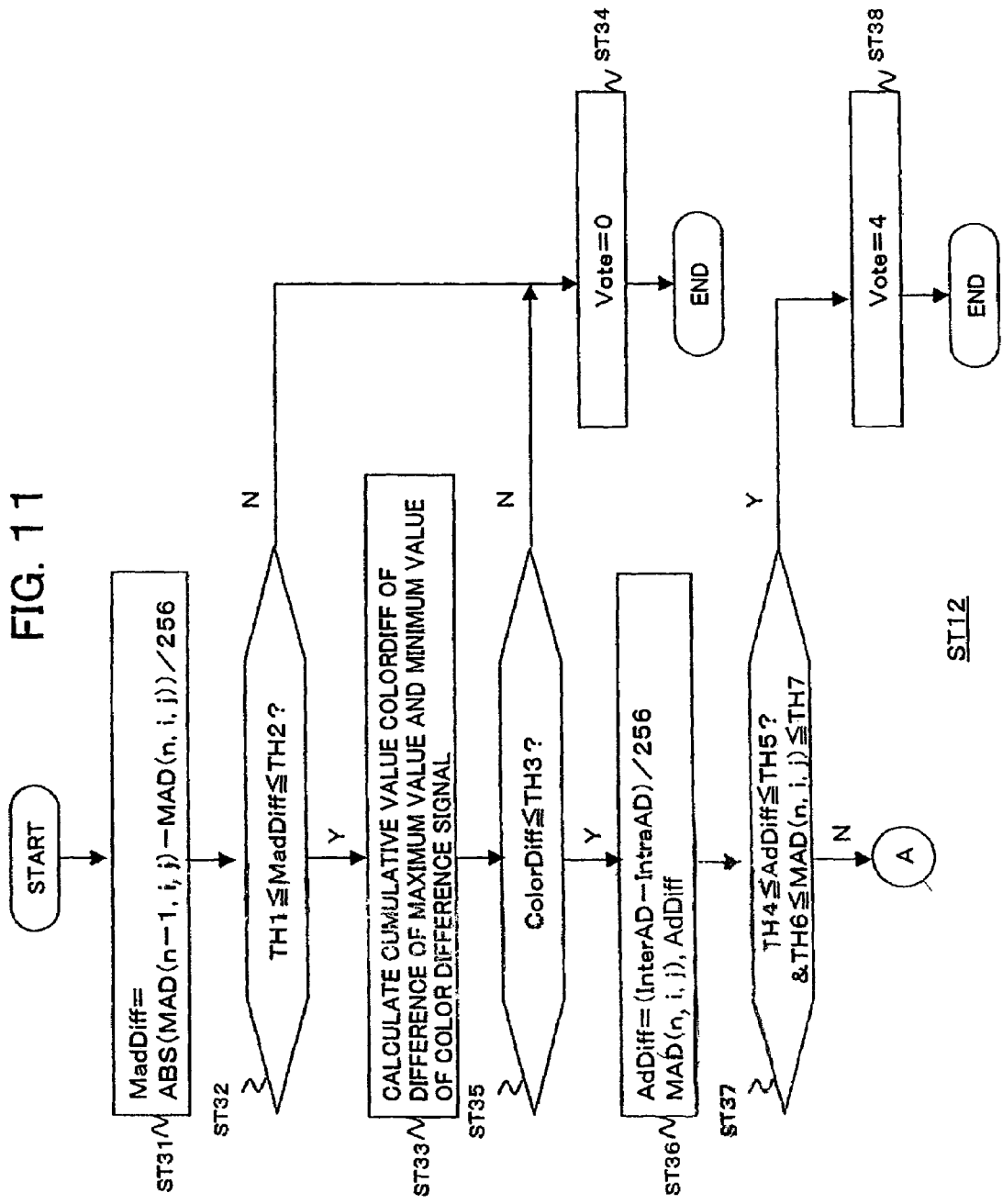
FIG. 11 is a flow chart for explaining the processing of step ST12 shown in FIG. 9 in more detail.
Figure 12:
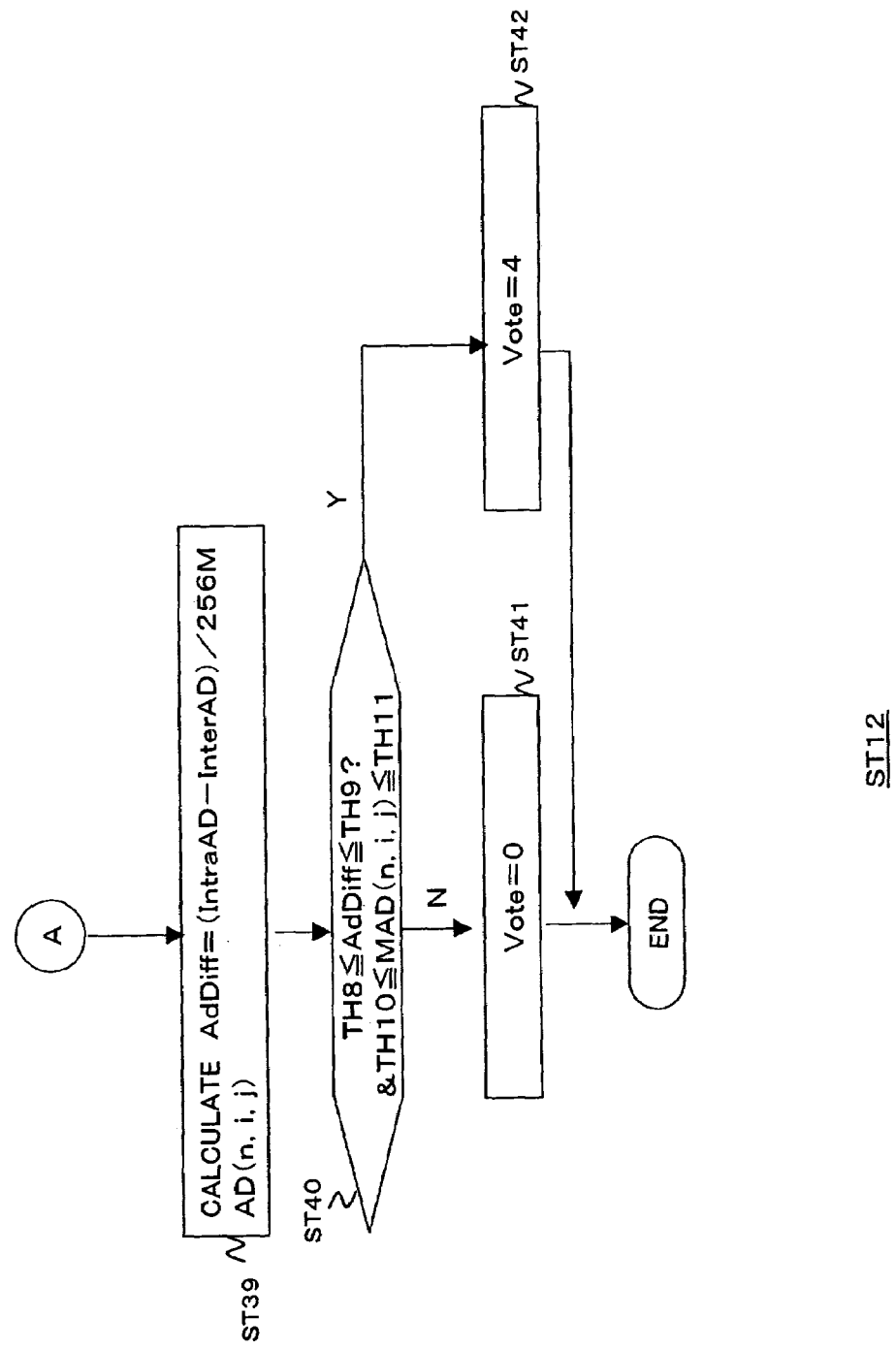
FIG. 12 is a flow chart continuing from FIG. 11 for explaining the processing of step ST12 shown in FIG. 9 in more detail.

Below, an explanation will be given of the processing for calculation of the refreshing occurrence prediction level Vote at step ST12 shown in FIG. 4. FIG. 11 and FIG. 12 are flow charts for explaining the processing of step ST12 shown in FIG. 4.

Step ST31

Figure 13A:
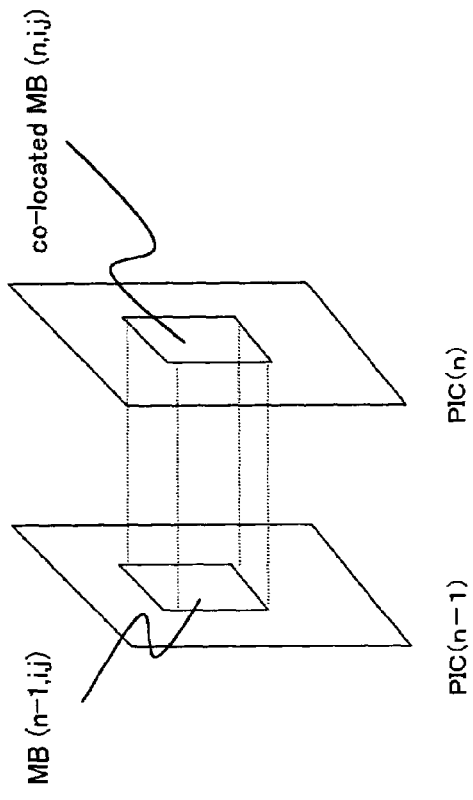
FIG. 13A is a view for explaining step ST31 shown in FIG. 11.

The refresh detection circuit 52 calculates MadDiff in accordance with the absolute value of the difference of MAD values between a macro block MB(n) of picture data PIC(n) being detected and a macro block MB(n−1) at a corresponding position of one previous picture data PIC(n−1) as shown in FIG. 13A by the following Equation (2). The MAD value indicates the value by obtained by adding up the differences between the mean absolute value of pixel data composing the macro block MB, the pixel values in the macro blocks MB, and the mean value of the pixel values in the macro block MB.

$$\text{MadDiff}=\text{ABS}(\text{MAD}(n-1,i,j)-\text{MAD}(n,i,j))/256 \quad (2)$$

Step ST32

The refresh detection circuit 52 judges whether or not a condition 1 shown in the following Equation (3) is satisfied. When it is judged that the condition 1 is satisfied, the routine proceeds to step ST33, while when not judging so, the routine proceeds to step ST34. The processings of steps ST31 and ST32 are performed based on the characteristic that refreshing easily occurs in macro blocks MB with little background motion.

$$TH1 \leq \text{MadDiff} \leq TH2 \quad (3)$$

Step ST33

Figure 13B:
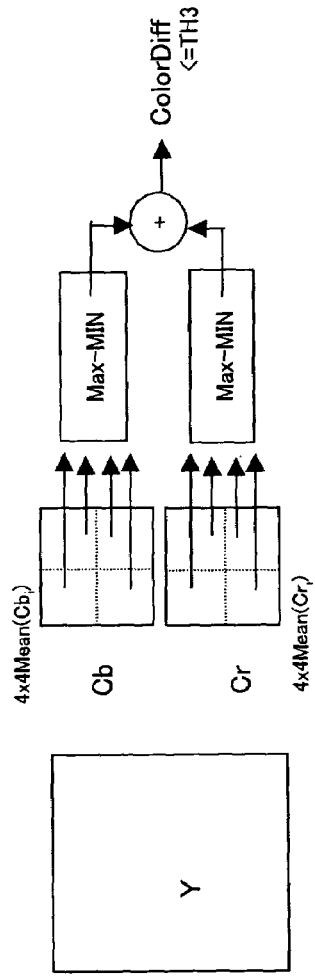
FIG. 13B is a view for explaining step ST33.

The refresh detection circuit 52 specifies the maximum value (Max) and the minimum value (Min) of the pixel data forming 4×4 color difference blocks Cb forming a macro block MB and calculates the difference of them as shown in FIG. 13B. Further, the refresh detection circuit 52 specifies the maximum value (Max) and the minimum value (Min) of the pixel data forming 4×4 color difference blocks Cr forming a macro block MB and calculates the difference of them as shown in FIG. 14B. The refresh detection circuit 52 adds the difference calculated for the color difference blocks Cb and the difference calculated for the color difference blocks Cr to calculate a value ColorDiff.

Step ST34

The refresh detection circuit 52 sets "0" as the refreshing occurrence prediction level Vote of the macro blocks MB being detected.

Step ST35

The refresh detection circuit 52 judges whether or not a condition 2 shown in the following Equation (4) is satisfied. When it is judged that the condition 2 is satisfied, the routine proceeds to step ST36, while when not judging so, the routine proceeds to step ST34. The processings of steps ST34 and ST35 are performed based on the characteristic that refreshing easily occurs in blocks MB having little color variation.

$$\text{ColorDiff} \leq TH3 \quad (4)$$

Step ST36

The refresh detection circuit 52 computes a value AdDiff by the following Equation (5) by using InterAD and IntraAD calculated at the motion prediction and compensation circuit 51 as explained at step ST11 shown in FIG. 4.

$$\text{AdDiff}=(\text{InterAD}-\text{IntraAD})/256 \quad (5)$$

Step ST37

The refresh detection circuit 52 judges whether or not a condition 3 shown in the following Equation (6) is satisfied based on the MAD(n,i,j) calculated at step ST31, and the AdDiff calculated at step ST36. When it is judged that the condition 3 is satisfied, the routine proceeds to step ST38, while when not judging so, the routine proceeds to step ST39. The processings of steps ST36 and ST37 are performed based on the characteristic that refreshing easily occurs in blocks MB having little color variation and macro blocks MB having relatively small IntraAD.

$$TH4 \leq \text{AdDiff} \leq TH5 \ \& \ TH6 \leq \text{MAD}(n,i,j) \leq TH7 \quad (6)$$

Step ST38

The refresh detection circuit 52 sets "4" as the refreshing occurrence prediction level Vote of the macro blocks MB being detected.

Step ST39

The refresh detection circuit 52 computes the value AdDiff according to the following Equation (7) by using InterAD and IntraAD calculated at the motion prediction and compensation circuit 51 as explained at step ST11 shown in FIG. 4.

$$\text{AdDiff}=(\text{IntraAD}-\text{InterAD})/256 \quad (7)$$

Step ST40

The refresh detection circuit 52 judges whether or not a condition 4 shown in the following Equation (8) is satisfied based on the MAD(n,i,j) calculated at step ST31 and the AdDiff calculated at step ST39. When it is judged that the condition 3 is satisfied, the routine proceeds to step ST42, while when not judging so, the routine proceeds to step ST41. The processings of steps ST39 and ST40 are performed based on the characteristic that refreshing easily occurs in blocks MB having large color variation and macro blocks MB having a relatively large IntraAD.

$$TH8 \leq AdDiff \leq TH9 \ \& \ TH10 \leq MAD(n,i,j) \leq TH11 \quad (8)$$

Step ST41

The refresh detection circuit 52 sets "0" as the refreshing occurrence prediction level Vote of the macro blocks MB being detected.

Step ST42

The refresh detection circuit 52 sets "4" as the refreshing occurrence prediction level Vote of the macro blocks MB being detected.

Refresh Countermeasure Circuit 53

Figure 14:
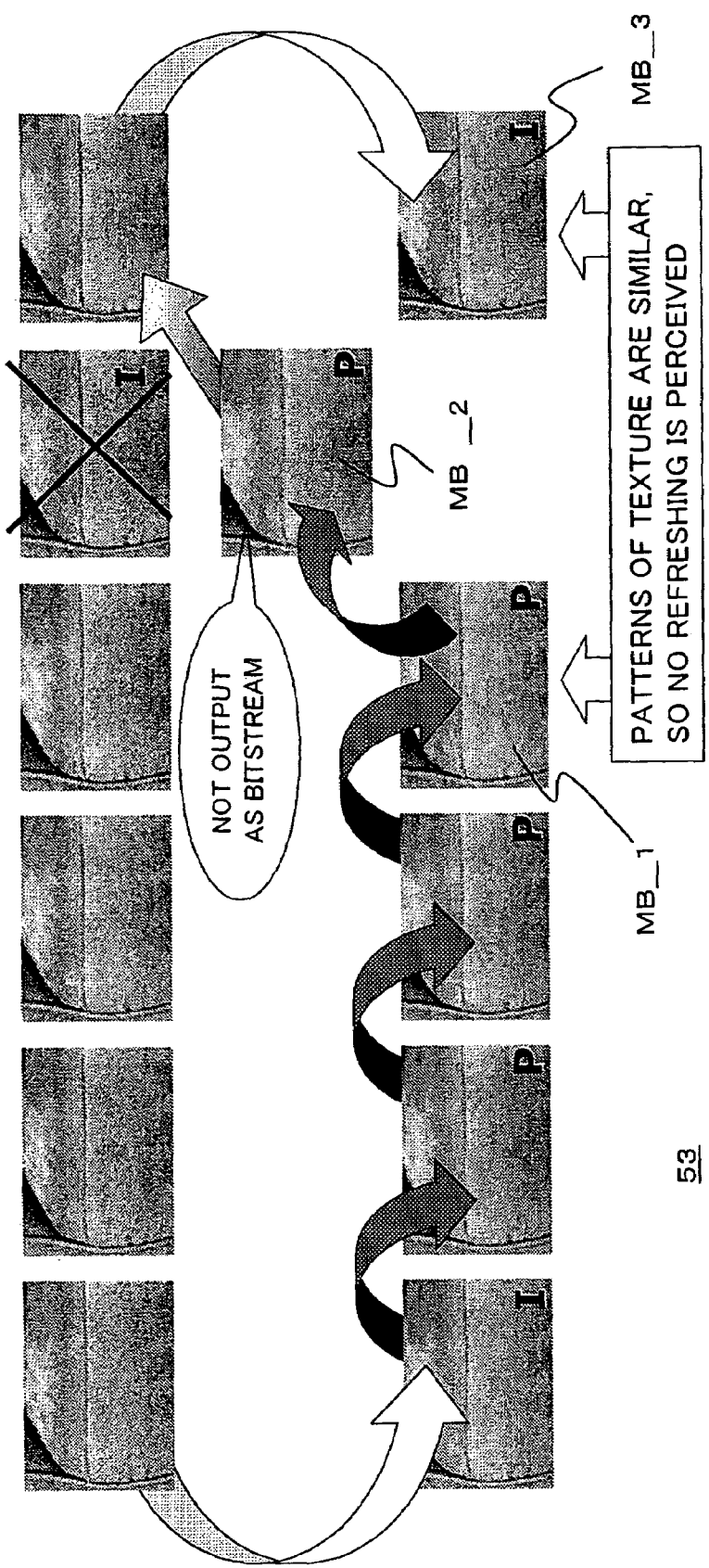
FIG. 14 is a view for explaining processing for refreshing countermeasures by a refresh countermeasure circuit 53 shown in FIG. 2.

For example, as shown in FIG. 14, when a macro block MB_2 covered by refreshing countermeasures belongs to I picture data in the picture type assignment circuit 22 and is determined to be I-(inter-frame) encoded, the refresh countermeasure circuit 53 forcibly performs P-(inter-frame) encoding based on the refreshing result input from the refresh detection circuit 52 (refreshing result based on the predicted values of InterAD and IntraAD). Due to this, the macro block MB_2 inherits the pattern of the macro block MB_1 before that and can make the refreshing hard to be perceived. Then, the refresh countermeasure circuit 53 defines the P-encoded macro block MB_2 as an I-encoded macro block MB_3. This is because the decoding device 3 performs the decoding assuming that there is I-picture data at constant intervals.

Note that, the refresh countermeasure circuit 53 may performs at least one processing among interframe coding processing, filtering processing in the time direction and processing using other image data which is encoded before as the original image data when the processing is the equivalent generating image data with the continuity between frames and quantizing the generated image data as original image data.

Refresh Countermeasure Circuit 54

Figure 15:
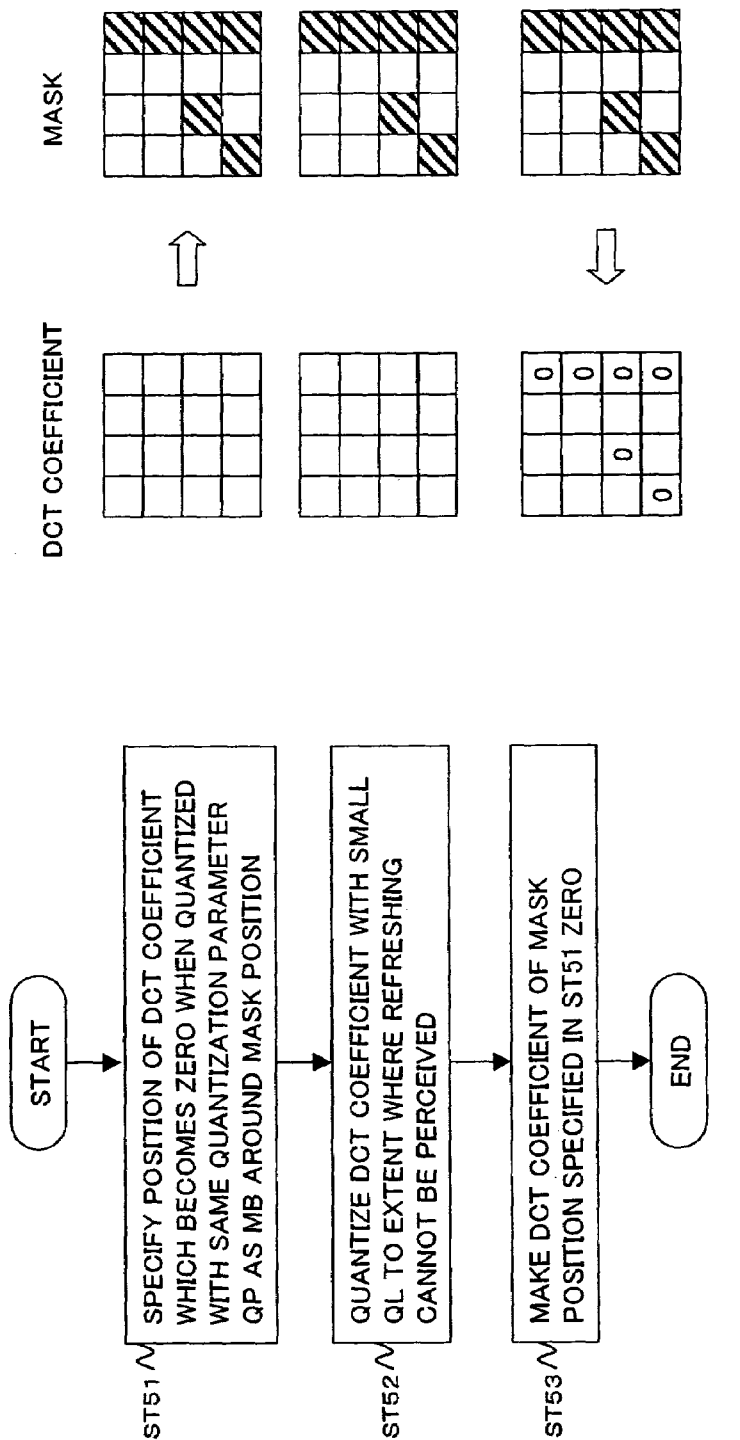
FIG. 15 is a flow chart for explaining processing by a refresh countermeasure circuit and a quantization circuit shown in FIG. 2.

The refresh countermeasure circuit 54 performs the processing for refreshing countermeasures shown in FIG. 15 for the macro blocks R-MB defined as being covered by the processing for refreshing countermeasures by the refreshing result performed by the refresh detection circuit 52 by using the actual interAD and IntraAD. Note that it is also possible if the refresh countermeasure circuit 54 performs the processing for refreshing countermeasures shown in FIG. 15 on the macro blocks R-MB defined as being covered by the processing for refreshing countermeasures by the refreshing result performed by the refresh detection circuit 52 by using predicted values of the interAD and IntraAD.

FIG. 15 is a flow chart for explaining the processings of the refresh countermeasure circuit 54 and the quantization circuit 33.

Step ST51

The refresh countermeasure circuit 54 receives as input image data indicating the DCT (orthogonal transform) coefficient from the orthogonal transform circuit 32. Then, the refresh countermeasure circuit 54 specifies as the mask position the position of the DCT coefficient which becomes zero when quantizing the DCT coefficient with the quantization parameter QP (quantization scale QS) of the macro blocks MB around a macro block MB covered by the refreshing countermeasures for each DCT coefficient of a macro block R-MB covered by the refreshing countermeasures.

Step ST52

The refresh countermeasure circuit 54 controls the quantization circuit 33 so as to quantize the DCT coefficient input from the orthogonal transform circuit 32 by the previously determined quantization parameter QP (quantization parameter for performing the quantization to an extent that the refreshing cannot be perceived).

Step ST53

The quantization circuit 33 makes the quantization value of the mask position specified at step ST51 zero among the quantization values generated at step ST52 and outputs the same to the reversible coding circuit 35 and the inverse quantization circuit 37 under the control of the refresh countermeasure circuit 54.

Note that, the refresh countermeasure circuit 54 may automatically determine the position of a DCT coefficient of a constant value or less as the mask position at for example step ST51 of FIG. 15. Further, the refresh countermeasure circuit 54 may determine a predetermined position as the mask position irrespective of the value of the DCT coefficient. Further, the refresh countermeasure circuit 54 may previously prepare patterns at a plurality of mask positions at step ST51 and selectively use these patterns in accordance with the characteristics of the image data. Further, the refresh countermeasure circuit 54 may define a threshold value higher than a DCT coefficient having a low frequency component in a DCT coefficient having a high frequency component so as to determine the mask position when determining the mask position based on the value of a DCT coefficient.

Below, an explanation will be given of the overall operation of the coding device 2 shown in FIG. 2. The image signal to be input is first converted to a digital signal at the A/D conversion circuit 21. Next, the picture type assignment circuit 22 assigns a picture type and subsequently, the frame rearrangement circuit 23 rearranges the picture data in accordance with the GOP structure of the image compression information, and the refresh countermeasure circuit 53 and the MB type determination circuit 26 output the picture data obtained by that to the computation circuit 31. In parallel with this, the motion prediction and compensation circuit 51 and the refresh detection circuit 52, as explained by using FIG. 4 etc., determine the macro blocks R-MB to be covered by processing for refreshing countermeasures based on the predicted values of InterAD and IntraAD.

For the picture data input to the computation circuit 31, either of intra-coding by the intra-prediction circuit 42 or inter-coding by the motion prediction and compensation circuit 43 is selected in units of macro blocks MB. The difference image finally generated at the computation circuit 31 undergoes the orthogonal transform processing at the orthogonal transform circuit 32 and the quantization processing at the quantization circuit 33, is reversibly coded at the reversible coding circuit 35, and then is written into the buffer memory 36.

At this time, the refresh detection circuit 52 determines the macro blocks R-MB to be processed for refreshing countermeasures based on the InterAD and IntraAD from the n motion prediction and compensation circuit 51, and the refresh countermeasure circuit 54 performs the processing for refreshing countermeasures shown in FIG. 15 based on the results. Further, the refresh countermeasure circuit 53 determines the macro blocks R-MB to be processed for refreshing countermeasures based on the actual interAD and IntraAD in accordance with the processing results of the motion prediction and compensation circuit 43 and the intra-prediction circuit 42. Then, the refresh countermeasure circuit 54 performs the processing for refreshing countermeasures shown in FIG. 15 for the determined macro blocks R-MB.

As explained above, according to the coding device 2, the refresh detection circuit 52 shown in FIG. 2 specifies the macro blocks R-MB having characteristics with a high possibility of occurrence of refreshing, and the refresh countermeasure circuit 53 and the refresh countermeasure circuit 54 previously apply the refreshing countermeasure processings so that the refreshing will not be perceived with respect to the macro blocks R-MB. Due to this, the decoding device 3 can suppress the perception of refreshing in the decoded image, and a higher quality image can be realized.

Decoding Device 3

Figure 16:
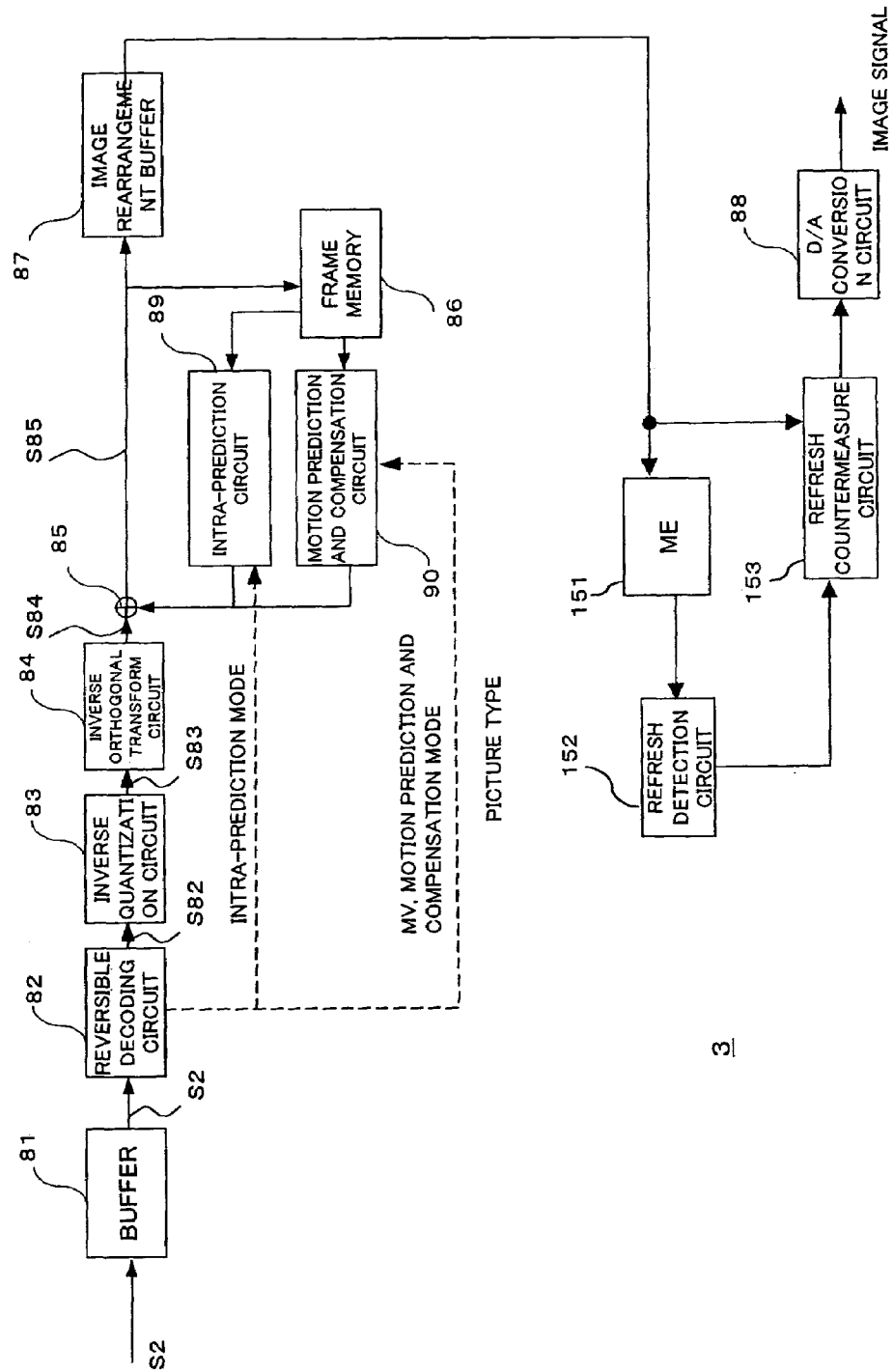
FIG. 16 is a view of the configuration of a decoding device shown in FIG. 1.

Below, an explanation will be given of the decoding device 3 shown in FIG. 1. FIG. 16 is a view of the configuration of the decoding device 3 shown in FIG. 1. As shown in FIG. 16, the decoding device 3 has for example a buffer memory 81, reversible decoding circuit 82, inverse quantization circuit 83, inverse orthogonal transform circuit 84, adder circuit 85, frame memory 86, image rearrangement buffer 87, D/A conversion circuit 88, intra-prediction circuit 89, motion prediction and compensation circuit 90, motion prediction and compensation circuit 151, refresh detection circuit 152, and refresh countermeasure circuit 153.

The buffer memory 81 stores the image data S2 as the bit stream received (input) from the coding device 2. The reversible decoding circuit 82 decodes the image data S2 read out from the buffer memory 81 by the method for the reversible coding by the reversible coding circuit 27 shown in FIG. 2 so as to generate the image data S82. The reversible decoding circuit 82 separates and decodes an orthogonal transform size signal TRSIZE multiplexed in the image data S2 and outputs the same to the inverse quantization circuit 83 and the inverse orthogonal transform circuit 84. The reversible decoding circuit 82 will be explained in detail later.

Based on the orthogonal transform size signal TRSIZE input from the reversible decoding circuit 82, the inverse quantization circuit 83 inversely quantizes the image data S82 after the reversible decoding input from the reversible decoding circuit 82 by an inverse quantization method corresponding to the quantization circuit 26 shown in FIG. 2 so as to generate image data S83 and outputs this to the inverse orthogonal transform circuit 84. Based on the orthogonal transform size signal TRSIZE input from the reversible decoding circuit 82, the inverse orthogonal transform circuit 84 applies an orthogonal inverse transform corresponding to the orthogonal transform of the orthogonal transform circuit 25 shown in FIG. 2 on the image data S83 input from the inverse quantization circuit 83 to generate image data S84 and outputs this to the adder circuit 85. The adder circuit 85 adds the predicted image input from the intra-prediction circuit 89 or the motion prediction and compensation circuit 90 and the image data S84 input from the inverse orthogonal transform circuit 84 so as to generate the image data S85 and outputs this to the frame memory 86 and the image rearrangement buffer 87. The image rearrangement buffer 87 rearranges the image data S85 input from the adder circuit 85 to a display sequence in units of pictures and outputs the same to the motion prediction and compensation circuit 151 and the refresh countermeasure circuit 153.

When the block data being decoded in the image data S85 read out from the frame memory 86 is data obtained by intra-prediction coding, the intra-prediction circuit 89 decodes the block data by the intra-method to generate predicted image data and outputs this to the adder circuit 85. When the block data being decoded in the image data S85 read out from the frame memory 86 is data obtained by inter-prediction coding, the motion prediction and compensation circuit 90 decodes the block data by the inter-method to generate predicted image data and outputs this to the adder circuit 85.

The motion prediction and compensation circuit 151 performs for example the same processing as that of the motion prediction and compensation circuit 51 shown in FIG. 2 to generates the predicted values of IntraAD and InterAD and outputs them to the refresh detection circuit 152.

The refresh detection circuit 152 specifies the macro blocks R-MB covered by the refreshing countermeasures by the same technique as that of the refresh detection circuit 52 based on the predicted values of IntraAD and InterAD input from the motion prediction and compensation circuit 151.

The refresh countermeasure circuit 153 adds the previously determined noise pattern to the macro blocks R-MB defined as being covered by the refreshing countermeasures in the refresh detection circuit 152 among the macro blocks MB forming the picture data input from the image rearrangement buffer 87 and outputs the picture data to the D/A conversion circuit 88.

The D/A conversion circuit 88 D/A converts the picture data input from the refresh countermeasure circuit 153 to generate an analog image signal.

As explained above, the decoding device 3 specifies macro blocks MB having a high possibility of perception of refreshing among the macro blocks MB in the decoded picture data at the refresh detection circuit 152 and positively adds the noise pattern to the macro blocks MB. By this, refreshing which is easily perceived in an image region having small motion or small color variation can be made hard to be perceived by the noise pattern, so the perceived quality of the decoded image can be improved.

Figure 17:
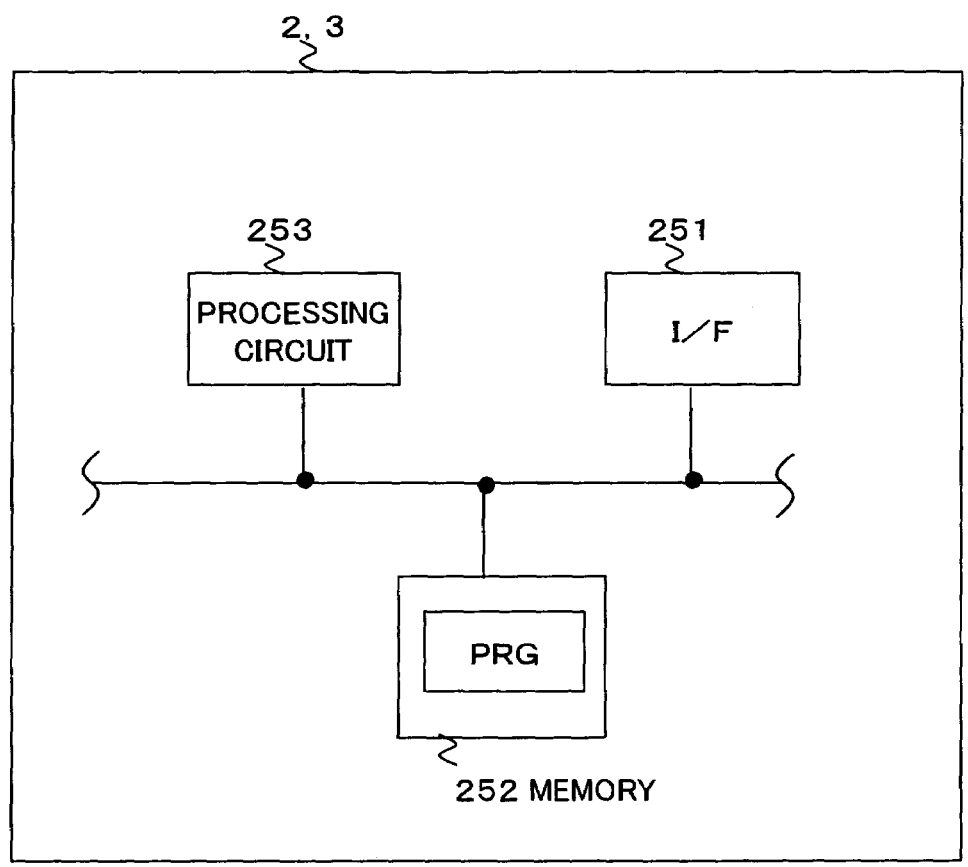
FIG. 17 is a view for explaining a modification of the coding device and the decoding device of the present embodiment.

It should be understood by those skilled in the art that various modifications, combinations, sub-combinations, and alterations may occur depending on design requirements and other factors insofar as they are within the scope of the appended claims or the equivalents thereof. For example, all or part of the functions of the coding device 2 or the decoding device 3 explained above can be executed by a central processing unit (CPU) or other processing circuit 253 according to the programming of the program PRG stored in a memory 252 as shown in FIG. 17. In this case, the image data being coded or the decoding object is input via an interface 251, and the processing result thereof is output.

What we claim is:

1. A coding device coding image data for transmission, the coding device comprising:

a specifying means for specifying image region data to be processed, for grain noise countermeasures in the image data being coded, based on an indicator indicating a degree by which grain noise is perceived for that image data; and a grain noise countermeasure means for applying processing for grain noise countermeasures to the image region data specified by the specifying means to adjust the image data to minimize grain noise when coding the image data.

2. A coding device as set forth in claim 1, wherein, when said image data forms moving image data, said specifying means specifies said image region data based on an amount of motion with other image data coded one time before in said image data.

3. A coding device as set forth in claim 2, wherein said specifying means specifies said image region data based on a difference between a predictive difference image in the case of inter-coding said image data forming said moving image data and a predictive difference image in the case of intra-coding it.

4. A coding device as set forth in claim 1, wherein said specifying means specifies said image region data based on a variation in color in said image data.

5. A coding device as set forth in claim 1, wherein, when said image data is encoded in units of block data, said specifying means specifies block data forming said image data as said image region data.

6. A coding device as set forth in claim 5, wherein said grain noise countermeasure means generates image data with the continuity between frames and quantizes the generated image data as original image data.

7. A coding device as set forth in claim 6, wherein said grain noise countermeasure means performs at least one processing among interframe coding processing, filtering processing in the time direction and processing using other image data which is encoded before as the original image data.

8. A coding device as set forth in claim 6, wherein said grain noise countermeasure means changes a quantization parameter of said block data changed for said interframe coding so as to become smaller than a predetermined quantization parameter.

9. A coding device as set forth in claim 5, wherein said grain noise countermeasure means forcibly makes zero an orthogonal transform coefficient becoming zero when quantizing by a quantization parameter set for block data around said block data among orthogonal transform coefficients of block data specified by said specifying means.

10. A coding method for a coding device coding image data for transmission comprising:
a first step of specifying image region data to be processed, for grain noise countermeasures in the image data being coded, based on an indicator indicating a degree by which grain noise is perceived for that image data; and
a second step of applying processing in a refresh detection circuit for grain noise countermeasures to the image region data specified in the first step to adjust the image data to minimize grain noise when coding the image data.

11. A computer readable medium encoded with a computer program run by a computer for coding image data for transmission comprising:
a first routine of specifying image region data to be processed, for grain noise countermeasures in the image data being coded, based on an indicator indicating a degree by which grain noise is perceived for the image data; and
a second routine of applying processing for grain noise countermeasures to the image region data specified in the first routine to adjust the image data to minimize grain noise when coding the image data.

12. A decoding device decoding encoded image data which has been adjusted to minimize grain noise, the decoding device comprising:
a decoding means for decoding the encoded image data, which has been adjusted to minimize the grain noise, to generate decoded image data,
a specifying means for specifying image region data to be processed, for grain noise countermeasures in the decoded image data generated by the decoding means, based on the decoded image data, and
a grain noise countermeasure means for applying processing for grain noise countermeasures to the image region data specified by the specifying means in the decoded image data generated by the decoding means.

13. A decoding device as set forth in claim 12, wherein, when said image data forms moving image data, said specifying means specifies said image region data based on an amount of motion with other image data coded one time before in said image data.

14. A decoding device as set forth in claim 13, wherein said specifying means specifies said image region data based on a difference between a predictive difference image in the case of inter-coding said image data forming said moving image data and a predictive difference image in the case of intra-coding it.

15. A decoding device as set forth in claim 12, wherein said specifying means specifies said image region data based on a variation in color in said image data.

16. A decoding device as set forth in claim 12, wherein said grain noise countermeasure means adds a noise pattern to said image region data.

17. A decoding method for a decoding device for decoding encoded image data which has been adjusted to minimize grain noise, the method comprising:
a first step of decoding, by a decoding circuit, the encoded image data, which has been adjusted to minimize the grain noise, to generate decoded image data,
a second step of specifying image region data to be processed, for grain noise countermeasures in the decoded image data generated in the first step, based on the decoded image data, and
a third step of applying the processing for grain noise countermeasures to the image region data specified in the second step in the decoded image data generated in the first step.

18. A computer readable medium encoded with a computer program run by a computer for decoding encoded image data which has been adjusted to minimize grain noise, the program comprising:
a first routine of decoding the encoded image data, which has been adjusted to minimize the grain noise, to generate decoded image data,
a second routine of specifying image region data to be processed, for grain noise countermeasures in the decoded image data generated in the first routine, based on the decoded image data, and
a third routine of applying processing for grain noise countermeasures to the image region data specified in the second routine in the decoded image data generated in the first routine.

* * * * *